United States Patent
Rumney (12)

(10) Patent No.: US 6,525,930 B1
(45) Date of Patent: Feb. 25, 2003

(54) MOUNTING MEDIA DRIVES IN A COMPUTER SYSTEM ON A CARRIAGE

(75) Inventor: Gary S. Rumney, Leighton Buzzard (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/415,759

(22) Filed: Oct. 8, 1999

(51) Int. Cl.[7] .............................. G06F 1/16; H05K 5/02
(52) U.S. Cl. ..................... 361/685; 361/724; 361/726
(58) Field of Search ................................. 361/679–686, 361/724–727; 312/223.1–223.3, 332.1, 333; 360/97.01, 98.01, 137, 137 D; 369/75.1–8.2

(56) References Cited

U.S. PATENT DOCUMENTS

| | | | | |
|---|---|---|---|---|
| 2,857,558 A | * | 10/1958 | Fiske | 361/685 |
| 4,660,125 A | * | 4/1987 | Purdy et al. | 361/685 |
| 4,833,554 A | * | 5/1989 | Dalziel et al. | 360/98.04 |
| 5,011,418 A | * | 4/1991 | Perzentka, Jr. | 361/725 |
| 5,067,041 A | * | 11/1991 | Cooke et al. | 361/683 |
| 5,124,886 A | * | 6/1992 | Golobay | 361/685 |
| 5,155,662 A | * | 10/1992 | I-Shou | 361/685 |
| 5,195,022 A | * | 3/1993 | Hoppal et al. | 361/685 |
| 5,333,097 A | * | 7/1994 | Christensen et al. | 361/685 |
| 5,460,441 A | * | 10/1995 | Hastings et al. | 361/685 |
| 5,503,472 A | * | 4/1996 | Vu et al. | 312/223.2 |
| 5,507,650 A | * | 4/1996 | Larabell | 361/685 |
| 5,650,910 A | * | 7/1997 | Winick et al. | 361/683 |
| 5,666,267 A | * | 9/1997 | Carter et al. | 361/685 |
| 5,682,291 A | * | 10/1997 | Jefferies et al. | 361/683 |
| 5,684,671 A | * | 11/1997 | Hobbs et al. | 361/683 |
| 5,777,845 A | * | 7/1998 | Krum et al. | 361/685 |
| 5,822,184 A | * | 10/1998 | Rabinovitz | 361/685 |
| 5,844,776 A | * | 12/1998 | Yamaguchi et al. | 361/685 |
| 5,852,546 A | * | 12/1998 | Randloff et al. | 361/685 |
| 5,896,273 A | * | 4/1999 | Varghese et al. | 361/724 |
| 5,978,821 A | * | 11/1999 | Freeny | 361/683 |
| 5,999,365 A | * | 12/1999 | Hasegawa et al. | 361/685 |
| 6,064,568 A | * | 5/2000 | Schmitt | 361/685 |
| 6,075,694 A | * | 6/2000 | Mills et al. | 361/685 |
| 6,078,503 A | * | 6/2000 | Gallagher et al. | 361/725 |
| 6,108,198 A | * | 8/2000 | Lin | 361/683 |
| 6,111,755 A | * | 8/2000 | Park | 361/685 |
| 6,144,549 A | * | 11/2000 | Moss et al. | 361/683 |
| 6,154,361 A | * | 11/2000 | Anderson et al. | 361/685 |
| 6,252,765 B1 | * | 6/2001 | Balzaretti et al. | 361/685 |
| 6,259,605 B1 | * | 7/2001 | Schmitt | 361/724 |

* cited by examiner

*Primary Examiner*—Lynn D. Feild
(74) *Attorney, Agent, or Firm*—Conley, Rose & Tayon, PC; B. Noël Kivlin

(57) ABSTRACT

A carriage, provided with a mounting for one or more media devices is slideably mountable in a system unit (for example a computer system unit) such that the carriage may be slid out of an aperture the system unit. The slideable carriage means that the system unit does not need to be opened in order to insert, remove, or replace a media drive. For example, a media drive can be removed from the system unit by sliding the carriage out of the system unit, disconnecting cables from the media drive and the removing the media drive from the carriage. Similarly, a media drive can be installed in the system unit by mounting the media drive in the carriage, connecting cables to the media drive and reinserting the carriage within the system unit. The use of the slideable carriage is particularly useful for rack mountable systems where it is undesirable to have to remove the system unit from the racking system to insert a media drive.

60 Claims, 11 Drawing Sheets

MOUNTING MEDIA DRIVES IN A COMPUTER SYSTEM ON A CARRIAGE

BACKGROUND OF THE INVENTION

This invention relates to improving the ease of maintenance and enhancement of computer systems in the field.

It is standard practice in designing computer systems to provide for components that can be swapped in and out. For example, a system unit typically has one or more slots on its front for receiving devices such as disk and tape drives, which can be swapped in and out. However, in practice, such operations can be awkward, particularly for systems intended to be rack-mounted, due to the need to remove the system unit from the rack, and then to open the system unit cover (which is typically formed in the upper surface thereof) in order to gain access to the mounting bracket and the connecting cables for the media drive(s). After securing the drive to the mounting brackets within the unit, and connecting the cables, the system unit cover can be replaced and the unit put back into the rack.

Accordingly the present invention seeks to provide for more ready replacement and/or installation and/or removal of media devices in a computer system unit.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a carriage for media devices slideably mountable in a system unit such that the carriage may be slid out of an aperture in the system unit, wherein the carriage is provided with a location for receiving at least one media drive.

The provision of the slideable carriage means that the system unit does not need to be opened in order to insert, remove, or replace a media drive.

For example, with an embodiment of the invention, steps in removing a media drive from the system unit can include sliding the carriage out of the system unit, disconnecting cables from the media drive and removing the media drive from the carriage. The disconnection of the cable from the media drive and the removal of the media drive from the carriage can thereby be done outside the system unit and without needing to open its cover.

Similarly, with an embodiment of the invention, steps in installing a media drive in the system unit can include sliding the carriage out of the system unit, mounting the media drive within the carriage, connecting cables to the media drive and reinserting the carriage within the system unit. The securing of the media drive to the carriage and the connection of the cable to the media drive can thereby be done outside the system unit and without needing to open its cover.

The securing of the carriage within the system unit can be achieved using suitable fastenings. For example, the carriage can be screwed to the system unit and/or it can be retained therein by means of a face plate that is secured to the system unit.

Similarly, the media drives can be secured within the slideable carriage using suitable fastenings, for example screws that pass through a side of the carriage into predetermined threaded holes in sides of the media drives.

In a preferred embodiment of the invention, the carriage is a single assembly with all the necessary fastening screws for attaching media drives and for securing the carriage in the system unit held in place. The carriage can be supplied with electromagnetic conductor blanks, held with spring clips, in the front of the carriage, so that full electromagnetic shielding is provided with no drives in place. When it is desired to install a drive, an appropriate one of the electromagnetic blanks is popped out and the drive can be inserted in its place.

In an embodiment of the invention, the aperture is in the front surface of a casing of the system unit, with a media bay being located behind the aperture. Alternatively, the aperture could be in the rear of the system unit, or indeed in any face of the system unit that is readily accessible. In the case of a rack mountable unit, the apertures are preferably located in the front and/or rear surfaces of the system unit, as these can enable access to the media drives without removing the system unit from the rack.

In accordance with another aspect of the invention, there is provided a system unit comprising an aperture in a surface thereof and a carriage as set out above, slideably mountable in the system unit such that the carriage may be slid out of the aperture.

In accordance with a further aspect of the invention, there is provided a method of installing a media drive in a system unit, the method includes: mounting a media drive in the carriage, configured to be slideably mounted within the system unit and connecting at least one cable to the media drive; and then sliding the carriage through an aperture in a surface of the system unit.

A method of removing a media drive from a system unit following installation thereof as set out above, the method includes: sliding the carriage out of the system unit; disconnecting cables from the media drive; and then removing the media drive from the carriage.

Thus, an example of the invention can avoid the need to remove the main cover of the system unit and, in the case of a rack mountable system unit, the removal of the system unit from the rack. It finds particular application in rack-mountable computer system units for telecommunications applications, where it is important to minimize down times when system changes and maintenance operations are performed. As the unit does not need to be removed from the rack and opened, removing, replacing and installing drives can be done very quickly and efficiently.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

In the following, a particular embodiment of the invention will be described by way of example only.

Figure 1:
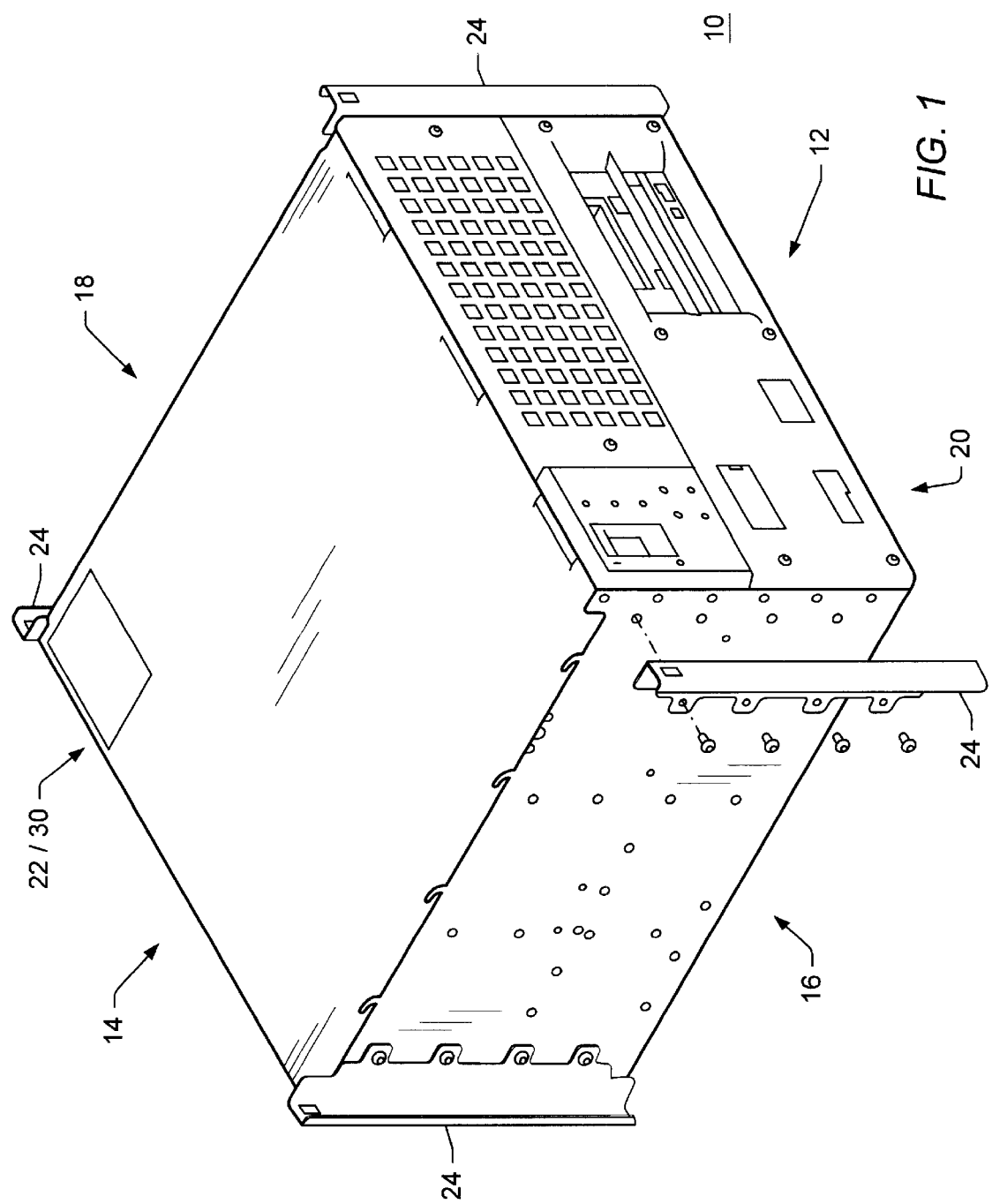
FIG. 1 is a perspective view from the front of an embodiment of the invention including sacrificial transport brackets.

FIG. 1 is a perspective view of a system unit 10 for use in a rack-mountable system. In a particular example described herein, the system unit is a computer system unit for forming a computer server for a telecommunications application, for example an Internet server. As shown in FIG. 1, the unit 10 has a front surface 12 formed by a front wall, a rear surface 14 formed by a rear wall, a left end surface 16 formed by a left side wall, a right end surface 18 formed by a right side wall, a lower surface 20 formed by a base wall and an upper surface 22, in the present example formed by a cover 30. As shown in FIG. 1, the system unit 10 is provided with sacrificial transport flanges 24, which extend above and below the system unit. This optional feature is removed before installation of the system unit 10 in a rack.

The system unit 10 is constructed with an extremely robust chassis 11, with the various walls 12–20 and the cover 30 forming the casing of the chassis 11 as well as internal walls (not shown) being formed of heavy gauge steel. The walls of the chassis can be made, for example, from electroless nickel-plated mild steel with a thickness of, for example, 1.5 to 2.0-mm.

The steel chassis 11 is pre-formed with mounting holes for the attachment of mounting flanges or a slide mechanism to enable the system unit 10 to be provided with a wide variety of mounting options and rack sizes. Mounting flanges can be provided to suit standard 19-inch, 23-inch, 24-inch or 600-mm nominal frame widths. (One inch= approximately 25.4 mm).

Figure 2A:
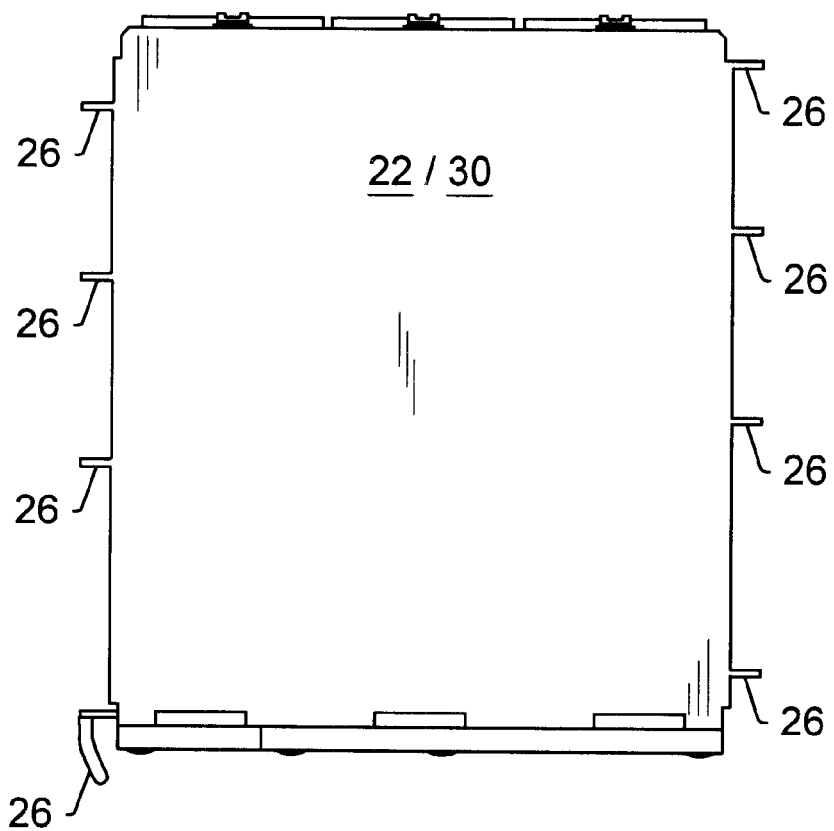
FIGS. 2A and 2B are plan and front views, respectively of the embodiment of FIG. 1 with alternative mounting brackets.

FIG. 2A is a plan view of the unit 10 showing the upper surface 22/cover 30 and various options for flanges 26 with the displacements from the front surface indicated in mm.

Figure 2B:
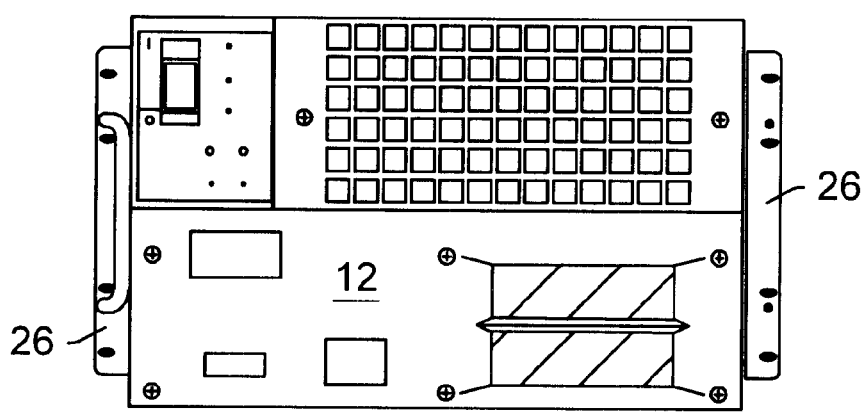

FIG. 2B is a front view of the unit 10 showing the front surface 12 and two different examples of mounting flanges 26. The mounting flange shown to the left (as seen in FIG. 2B) is provided with a handle to facilitate insertion and removal of the unit 10 from the racking system, whereas the flange 26 to the right (as viewed in FIG. 2B) is not provided with a handle.

Figure 2C:
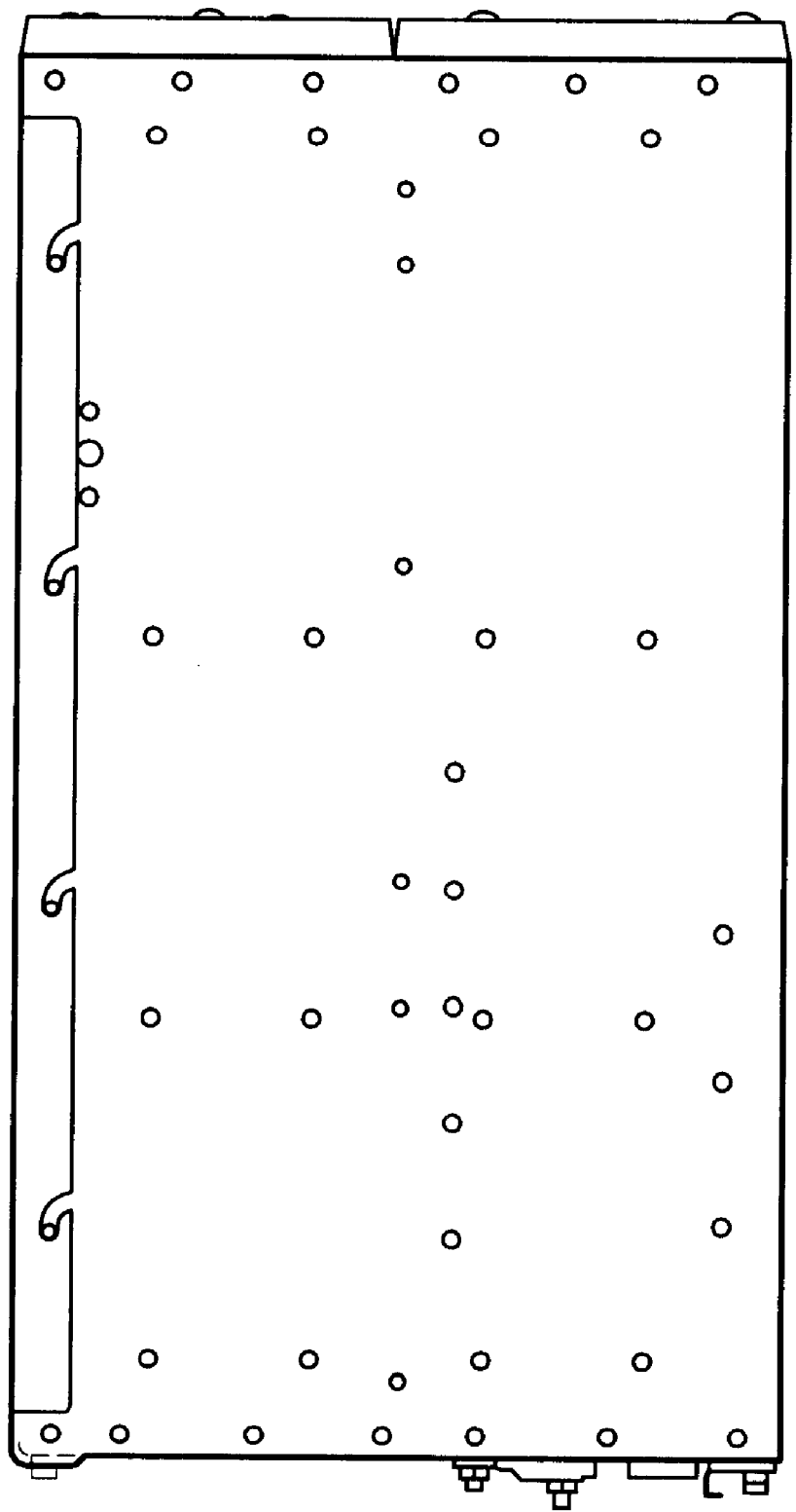
FIG. 2C is a side view showing the mounting holes for alternative types of mounting arrangements.

In the present example, the mounting flanges can be attached using screws which pass through the mounting flange into threaded holes in the end walls 14, 16 at either side of the chassis 11 of the unit 10. FIG. 2C is a side view of the system unit 10, showing the holes in the side of the system unit 10 for the mounting of flanges or a slide mechanism. Vertical rows of holes are for the attachment of flanges to be attached to vertical rack components, and horizontal rows of holes provide for the attachment of a runners for permitting a slideable mounting of the system unit in a rack.

Figure 3:
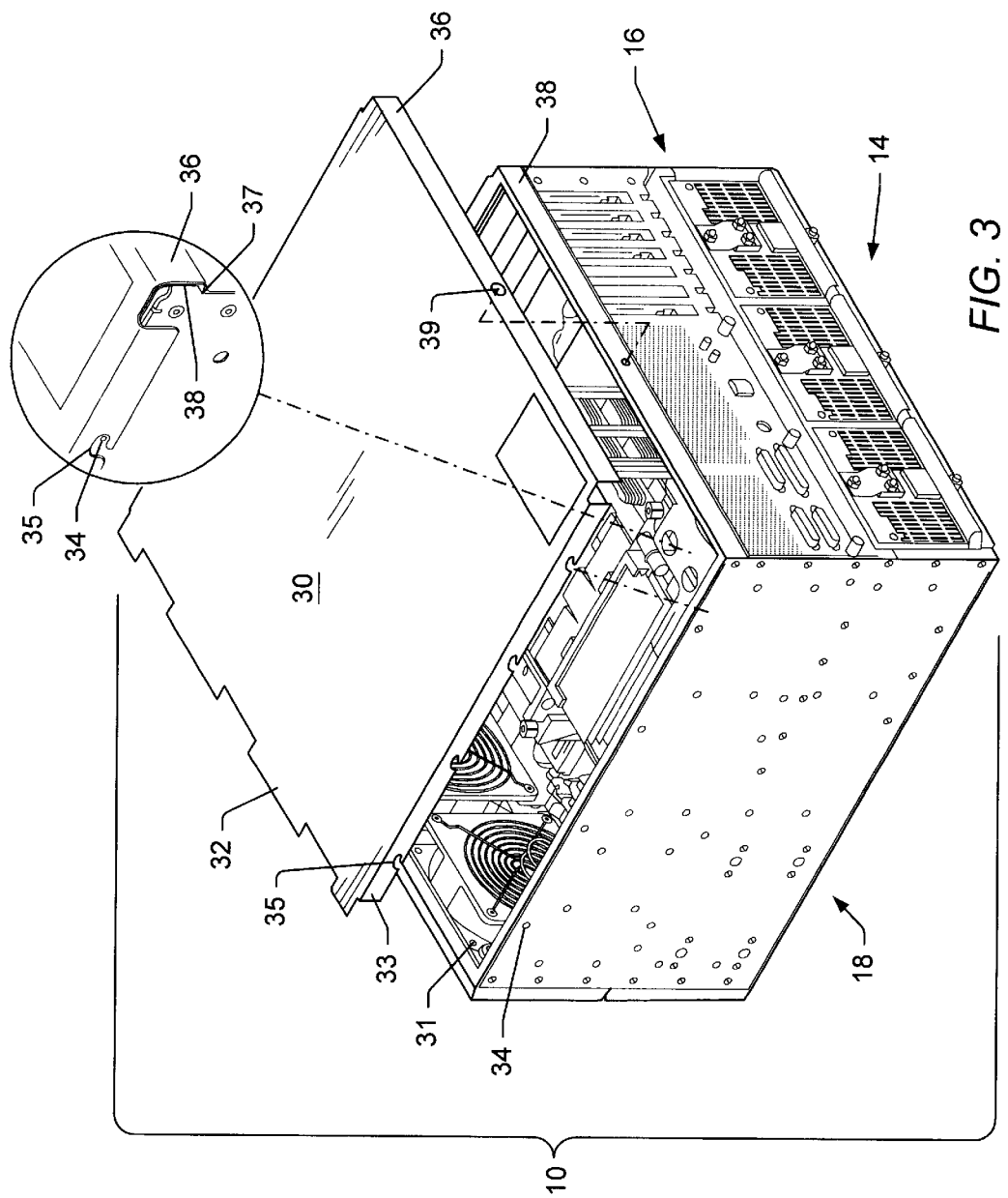
FIG. 3 is perspective view from the rear of the embodiment FIGS. 1 and 2 illustrating a removable top cover.

FIG. 3 is a perspective rear view of the unit 10 showing the cover 30 that forms the top surface 22 of the unit 10. As can be seen, the cover 30 is provided with front locating flanges 32 that, in use, engage a co-operating front flange 31 of the body of the chassis 11. Side flanges 33 engage either side of the end walls forming the left and right ends 16 and 18 of the chassis 11. Detents 34 on those end walls engage within L-shaped slots 35 in the side flanges 33 so that the cover may be lowered onto the top of the chassis 11 and then moved forwards so as to cause the detents 34 to latch within the slots 35. At the rear of the cover 30, a rear flange 36 with a lower lip 37 engages over an abutment 38 at the top of the rear end wall 14 of the casing 10. The cover can be secured to the remainder of the chassis 11 by means of a screw 39 that passes through this rear flange into a threaded hole in the abutment 38.

Figure 4:
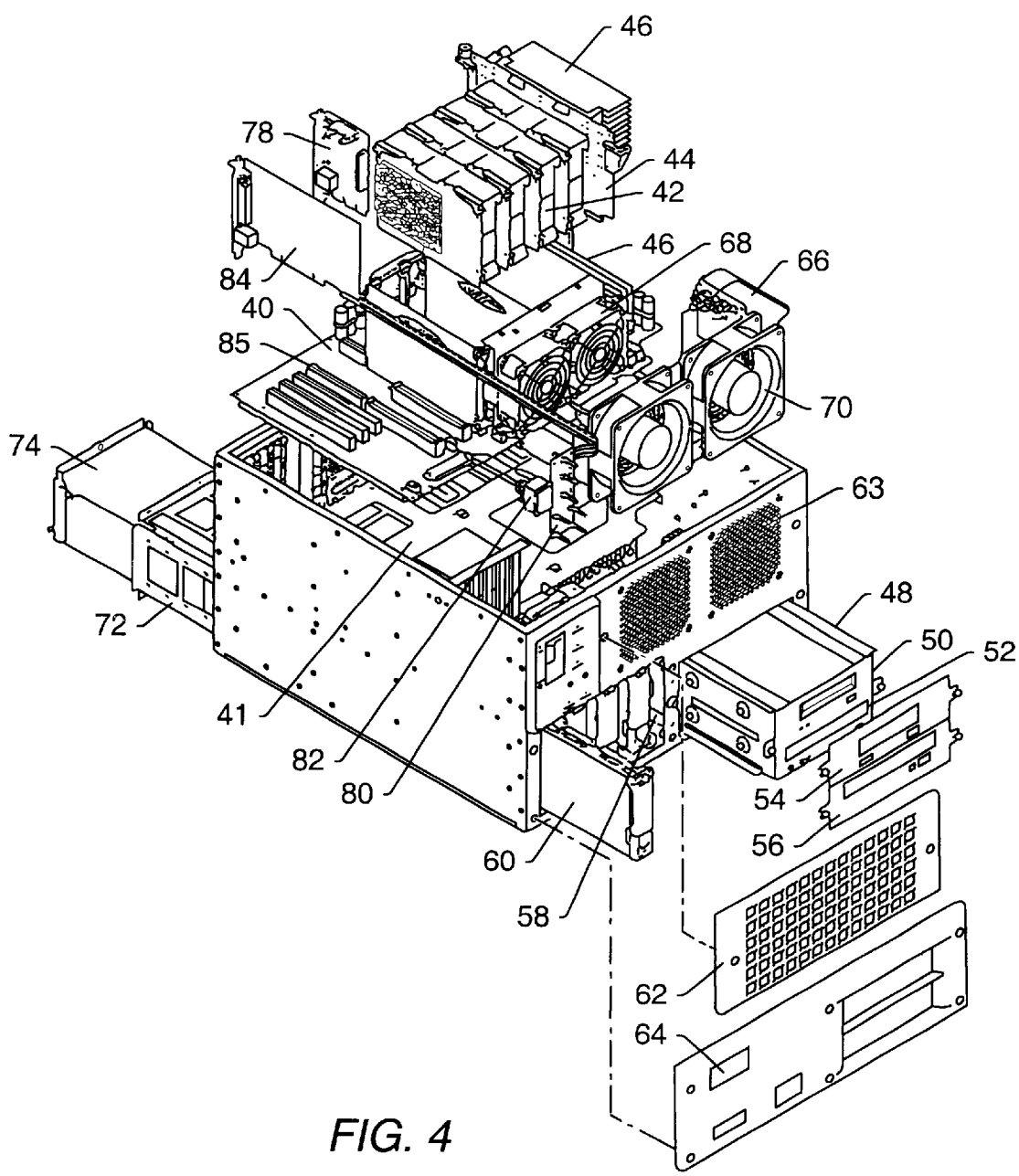
FIG. 4 is an exploded view of the aforementioned embodiment.

FIG. 4 is an exploded perspective view from the front of the system unit 10. This shows a motherboard 40 that is mounted on a horizontal mounting plane 41 within the chassis 11. Mounted on the motherboard 40 are between one and four processor modules 42. A riser card 44 can receive a plurality of dual in-line memory modules (DIMMs) 46. Further DIMMs 46 can be received directly in slots in the motherboard. A slideable carriage 48 is provided for receiving one or more media drives.

As shown in FIG. 4, the slideable carriage 48 can receive up to two media drives. In the present instance, two media drives including a digital audio tape (DAT) drive 50 and a CD-ROM drive 52 are provided. Appropriately configured metal cover plates 54 and 56 are provided for the media drives 50 and 52. A disc bay assembly 58 provides a small computer system interface (SCSI) backplane and cables for receiving one or more SCSI media drives, such as a SCSI disc drive 60. Although, in the present instance, the drives are controlled via a SCSI-type interface, it will be appreciated that another media drive interface (e.g., IDE) could be used. A SCSI card (not shown) is located within the chassis to the front of the motherboard. A bezel (decor panel) 62 is provided for covering ventilation holes 63 in the front wall 12 of the chassis 11. A bezel 64 is provided for covering the media drives 50, 52 and 60.

A fan control module 66 controls the operation of processor fans 68 and system fans 70. A power sub-assembly that includes a power sub-frame 72 with a power distribution board assembly, is provided for receiving three separate power supply units 74. An alarms module in the form of an alarms card 78 enables the signalling of alarms to the outside world, and is also connected to an LED card 2 for signalling alarms locally on the front of the unit 10. A power switch 82 is also provided on the front surface of the unit 10. FIG. 4 also illustrates one PCI card 84 to be received within a PCI slot 85 on the motherboard 40.

Figure 5:
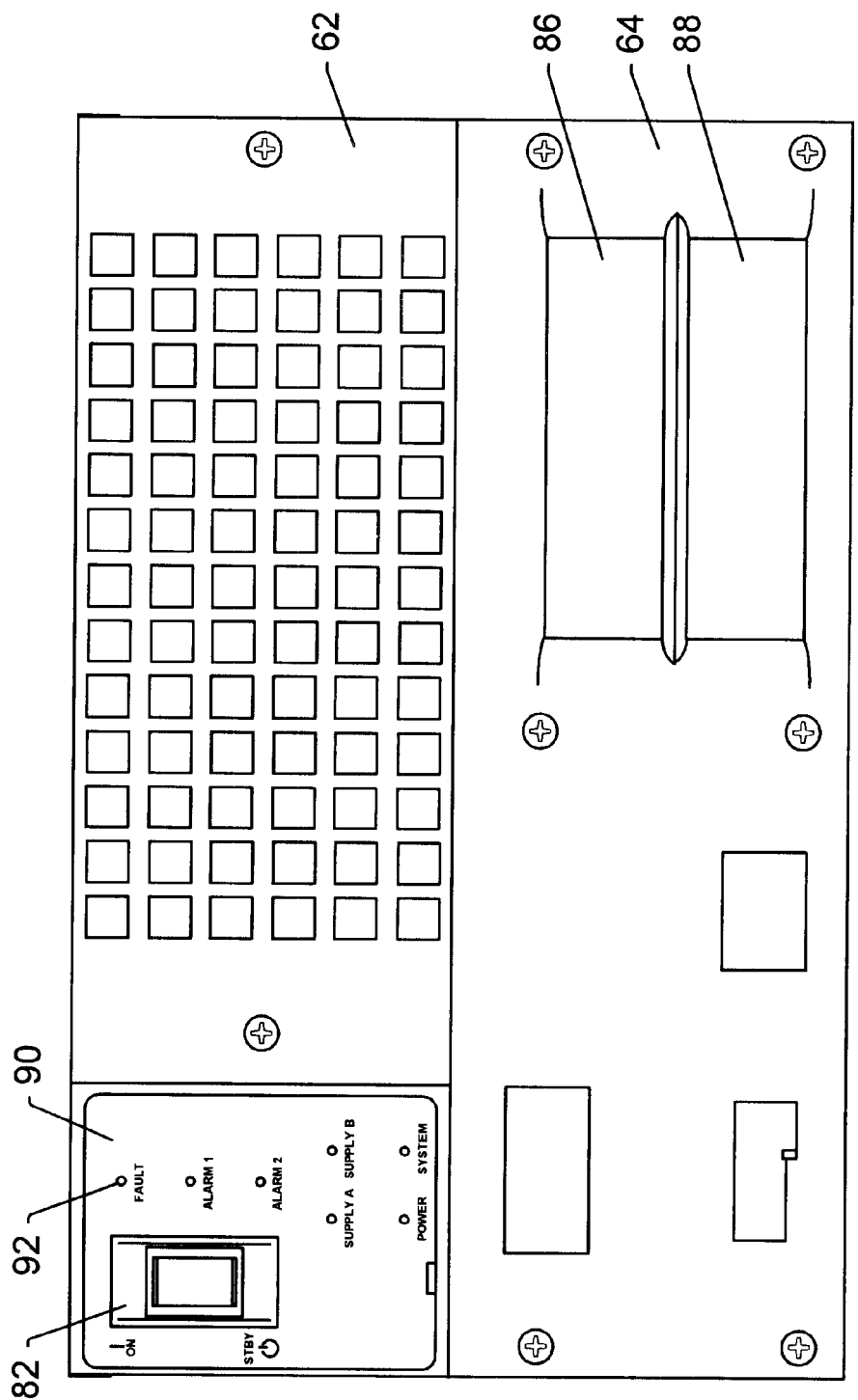
FIG. 5 is a front view of the aforementioned embodiment.

FIG. 5 is a front view of the unit 10 showing the bezels 62 and 64, a power and alarm panel 90 which includes the power switch 82 and a number of status light emitting diodes (LEDs) 92. FIG. 5 also illustrates the slots 86 and 88 for the media drives such as media drives 50 and 52 shown in FIG. 4.

Figure 6:
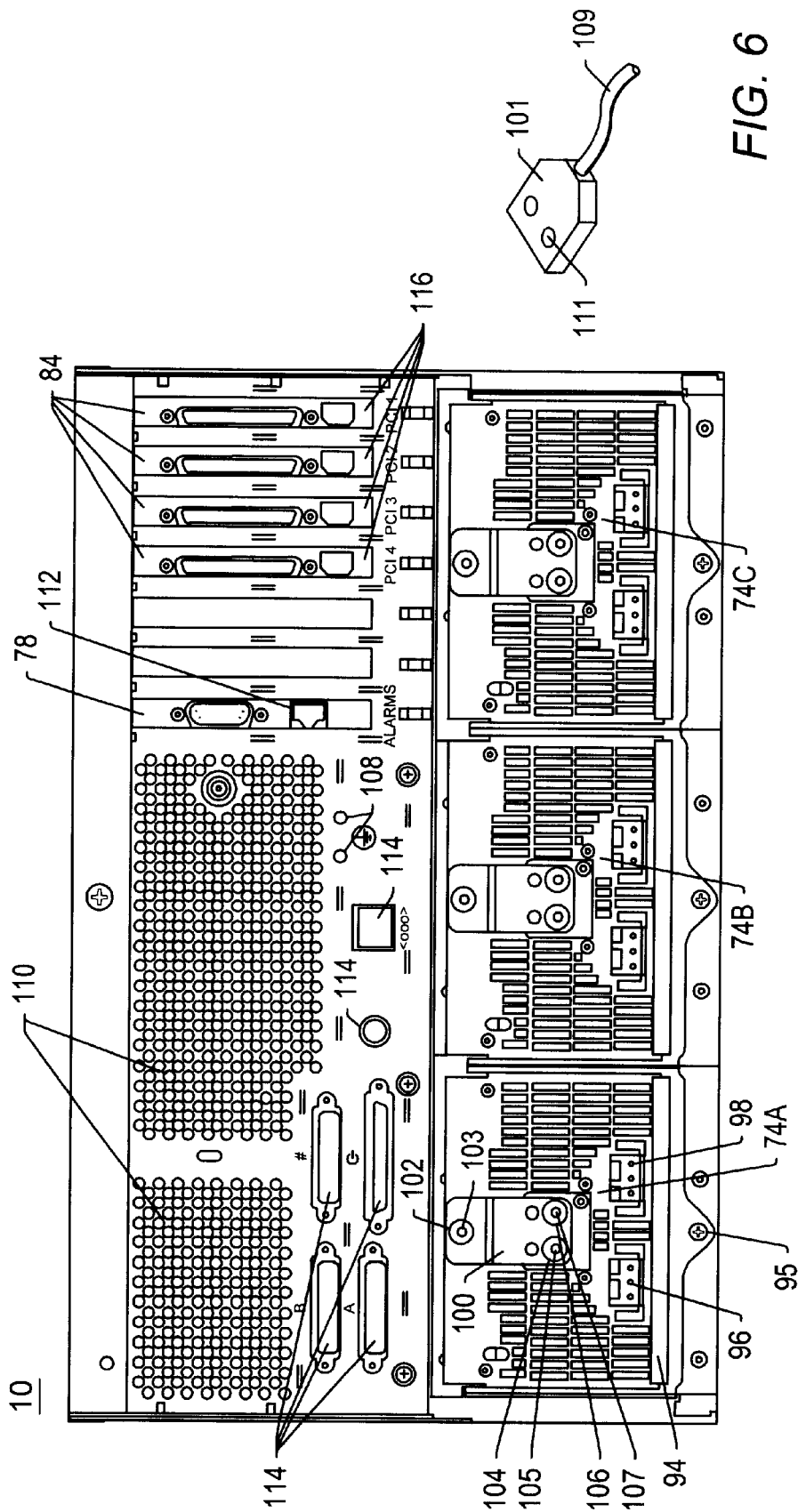
FIG. 6 is a rear view of the aforementioned embodiment.

FIG. 6 is a rear view of the unit 10 in a configuration with three DC power supply units 74A, 74B and 74C. Each of the power supply units 74A, 74B and 74C is the same, and provides redundant power for the unit 10. However, as will be seen later, one or more of the DC power supply units could be replaced by AC (mains) power supply units. The power supplies are hot swappable (i.e., while the system is running), as long as they are swapped one at a time.

With regard to power supply unit 74A, it can be seen that this is provided with a handle 94 that is used for inserting and removing the power supply unit 74A. The handle 94 includes a flange portion that is able to receive a screw 95 for securing the power supply unit to the chassis 11. First and second power cable sockets 96 and 98 are shown.

Also shown is a grounding plate 100 that is secured by knurled nuts 102, 104 and 106 to grounding studs 103, 105 and 107. Grounding stud 103 provides a connection directly to the chassis 11 of the unit 10. Grounding studs 105 and 107, on the other hand are electrically isolated from the chassis by an insulating board and are instead connected to logic ground (i.e. the ground of the electronic circuitry). By means of the grounding plate 100, logic ground can be connected directly to chassis ground. The provision of this grounding plate provides for optional tying of logic ground to chassis ground. It will be noted that each of the power supply units 74 is provided with a similar grounding plate 100, for connection to corresponding grounding studs. If it is desired to isolate logic ground from chassis ground, it is necessary to remove the grounding plate 100 from each of the power supply units 74A, 74B and 74C.

An isolated ground system is needed in some telco applications when operating in a Regional Bell Operating Company (RBOC) mode. When operating in such a mode, the chassis and logic ground are connected at a remote location to provide, for example, lightning protection. In this case two-hole lugs 101 having a pair of holes 111 to fit over the pair of grounding studs 105 and 107 are provided for each of the power supply units 74 and are secured over the studs using nuts 104 and 106. A similar two-hole lug 101 is secured to the grounding studs 108 and is secured with similar nuts. Earthing wires 109 from each of the two-hole lugs 101 on the power units and the chassis then are taken to the remote, earthing location. The studs 103 105, 107 and 108 are of a standard thread size (M5). The studs 105/107 and the studs 108 are at a standard separation (15.85 mm). The studs 105/107 are self-retaining in the insulated board on the power supply units. The stud 103 is self-retaining in the casing of its power supply unit 74. The suds 108 are also self-retaining in the system unit chassis.

In a non-isolated ground situation, chassis ground can simply be tied to a desired ground potential (for example, to the racking system) by connecting a grounding cable to grounding studs 108 provided on the rear of the chassis. A further earth connection is provided via the power cables for the power supplies.

FIG. 6 also illustrates rear ventilation holes 110 through which air is vented from the system. FIG. 6 also shows the alarms module 78 with a serial connector 112 enabling connection of the alarms module to a network for the communication of faults and/or for diagnostic operations on the unit 10 to be performed from a remote location. FIG. 6 also shows a number of PCI cards 84 received within respective PCI slots 116. A number of further external connections 114 are provided for connection of serial connections, parallel connections and SCSI connections, and for the connection of a keyboard or a Twisted-Pair Ethernet (TPE) connector.

Figure 7:
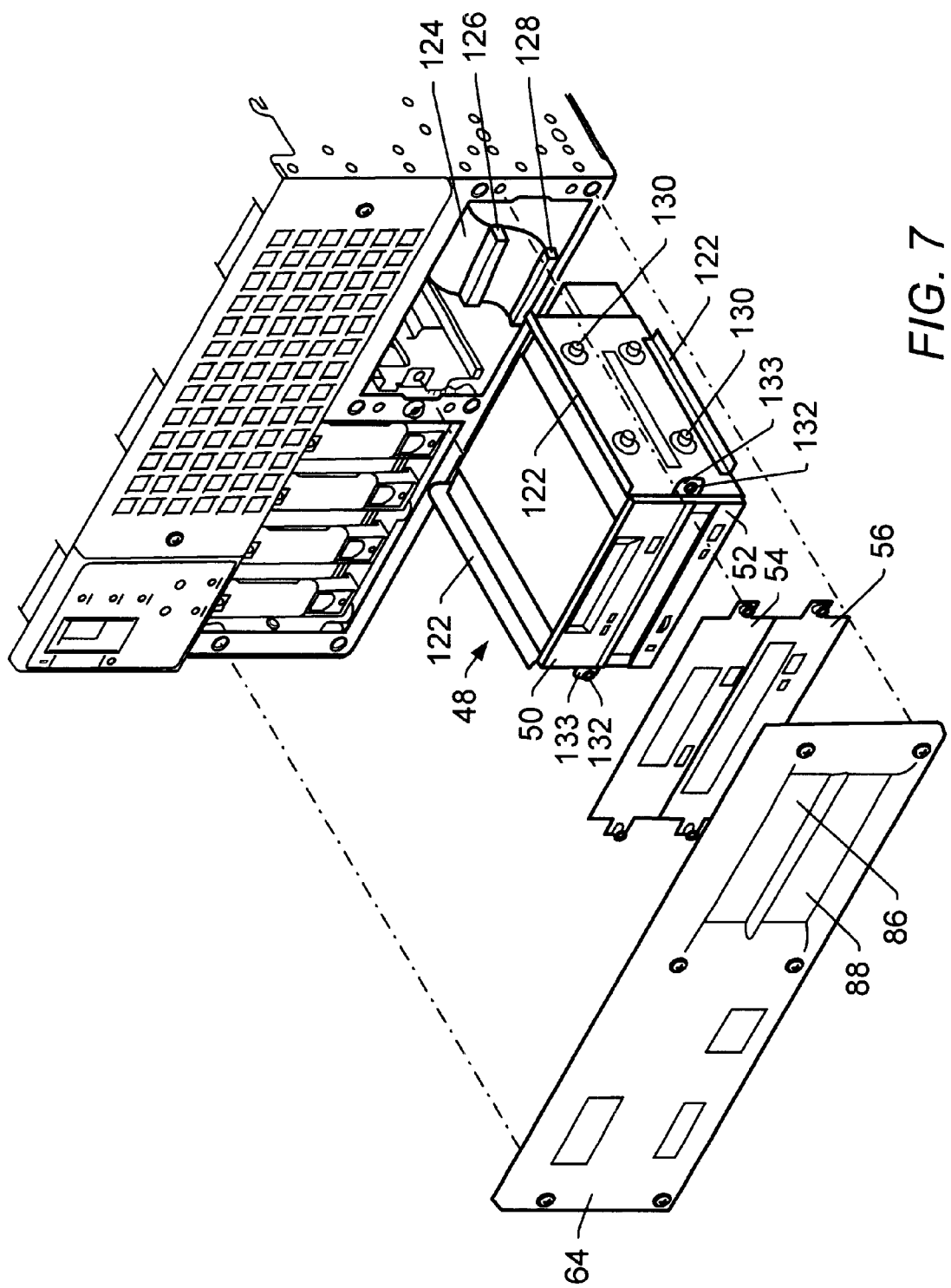
FIG. 7 is perspective view from the front of the embodiment FIGS. 1 and 2 illustrating the removal of a slideable carriage for one or media drives.

FIG. 7 is a perspective view of the front of the system unit 10 showing, in more detail, the mounting of the media devices 50 and 52 in the slideable carriage 48. FIG. 7 also shows the metal cover plates 54 and 56 for the media drives 50 and 52, that in use complete the electromagnetic shielding for the system unit 10. A front bezel 64 with apertures 86 and 88 for the media drives 50 and 52, respectively can be secured to the front of the system unit by means of 1/4 turn fasteners.

The chassis 48 defines an upper compartment (or a first drive location) for the first media drive 50 and a lower compartment (or second drive location) for a second media drive 52. Each of the compartments for the media drives is provided with four screws 130 for screwing into threaded holes in the sides of the media drives, which holes are provided at standard positions. The screws 130 are preferably self-retaining in the slideable carriage 48 so that they cannot fall out. Zero, one or two media drives can be mounted in the present example of the carriage 48. Once the media drives have been secured into position in the carriage 48, standard connectors (not shown) at the rear of the media drives 50 and/or 52 can be connected to corresponding connectors. These include signal connectors 126 and 128, for the media drives 50 and 52 respectively, on a flexible cable 124 which can be a SCSI standard cable, or an IDE standard cable, as appropriate. Power connectors 127 on power cables 129 also need to be connected. The cables are configured to be of sufficient length to be able to extend out of the aperture in the system unit whereby connection of the connectors may readily be effected outside the system unit.

The carriage 48 is provided with flanges 122 at the upper and lower edges thereof. These flanges are arranged to form guide followers that engage with corresponding guides 120 provided at upper and lower portions at either side of a bay 138 for receiving the carriage. When the carriage 48 has been slid fully back into the bay 138, the carriage 48 can be secured in place by means of screws 132 provided on small flanges 133 at the front of the carriage 48. These screws 132 engage in threaded holes 134 provided in small corresponding flanges 135 at the left and right sides of the bay 138. These screws 132 are also arranged to be self-retaining in the flanges 133 so that they cannot be lost. The cover plate(s) 54 and/or 56 can then be screwed in place in front of the media drives 50 and 52 by means of further screws, which in the preferred embodiment are self-retaining in the cover plate(s) 54/56 concerned. The front bezel 64 can be secured in place (in the present example by 1/4 turn fasteners).

As an alternative to providing screws for securing the media drives in the carriage, another arrangement could be provided, for example using a resilient or other latching mechanism. As a further alternative, a simple friction fit could be employed, for example by fitting the drive between flanges. Similarly, as an alternative to providing screws for securing the carriage in the system unit, another arrangement could be provided, for example using a resilient or other latching mechanism. As a further alternative, the cover plates 54 and 46 could be used to this effect.

However, in the particularly preferred embodiment, screws are used for securing the media drives within the carriage 48, for securing the carriage to the system unit chassis 11 and for securing the cover plates 54/56 to the system unit chassis 11. Each of these screws is arranged to be self-retaining so that the carriage 48 is provided as an integral, user friendly unit. When the system unit is initially supplied, metallic electromagnetic conduction blanks with spring clip fastenings are mounted at the front of each vacant compartment in the carriage. In the absence of a media drive in the compartment of the carriage, this effectively blanks the front panel of the location for mounting the drive. The metal electromagnetic conduction blanks can be provided with a plastics cover for decorative and electrical insulating purposes. These blanks will be behind the cover plates 54 and 56 and behind the bezel 64. When it is desired to install a media drive, an appropriate blank can be popped out and replaced with the drive.

Figure 8:
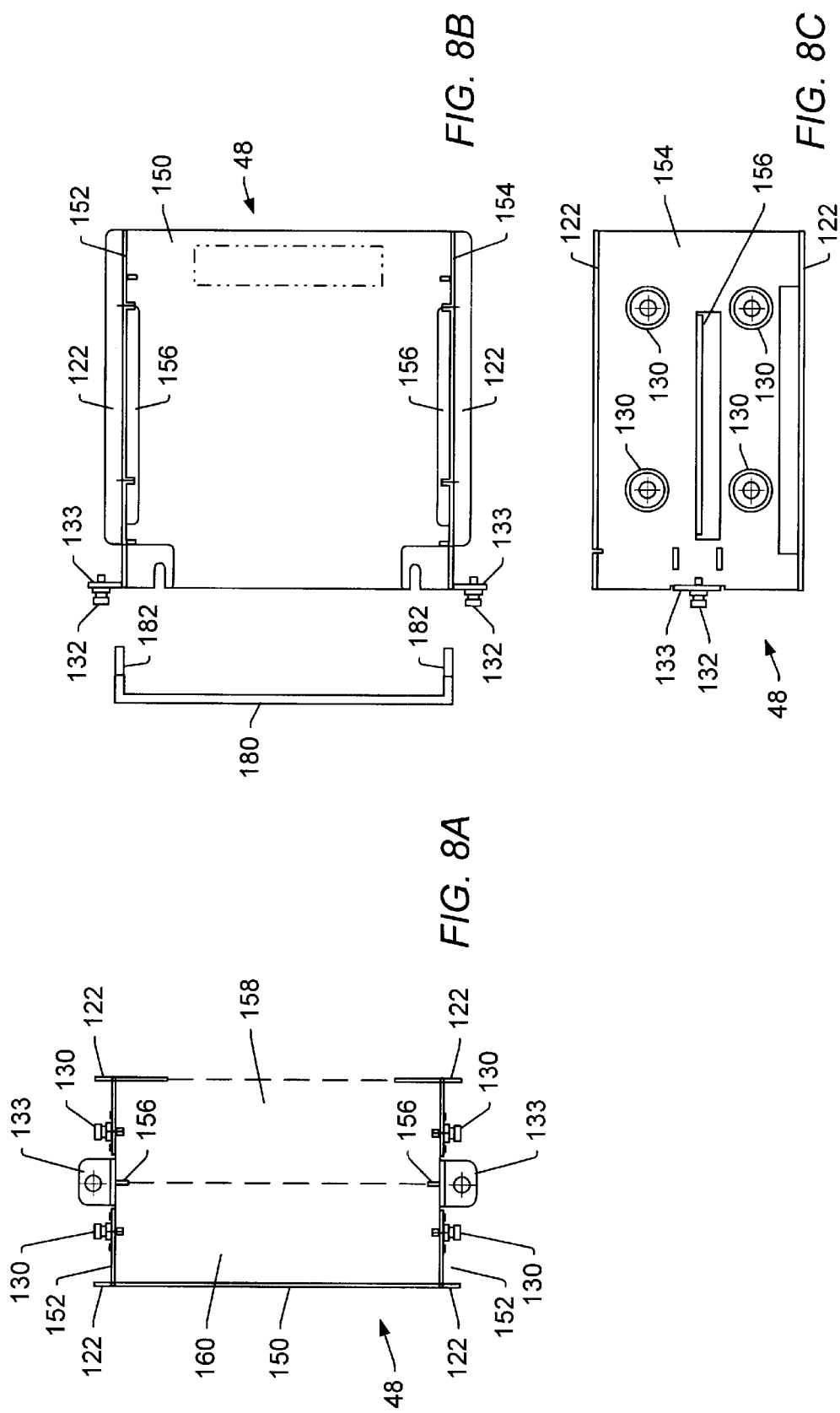
FIGS. 8A, 8B, and 8C are plan, front, side and perspective views of the carriage.

FIGS. 8A, 8B and 8C are front, plan and side views of the carriage 48. The carriage 48 is substantially "U" shaped and the body of the carriage can be stamped from a single piece of sheet metal to define a base 150 and two side walls 152 and 154. Part way (approximately half way) up both of the walls an inwardly facing lip 156 is formed that acts to separate the carriage into an upper compartment 158 and a lower compartment 160, each for receiving a media drive 50,52. Zero, one or two media drives can be mounted in the present example of the carriage 48. However, it will be appreciated that the carriage could similarly be subdivided into more compartments, or could alternatively be configured to provide a single compartment. Also, the sizes of the compartments could be set to be the same or different by setting the lip(s) at appropriate positions. Each of the compartments 158, 160 for the media drives is provided with four screws 130 for screwing into threaded holes in the sides of the media drives, which are provided at standard positions. The screws 130 are preferably retained in the slideable carriage 48 so that they cannot fall out. The flanges 122 at the upper and lower edges of the carriage 48 are stamped and folded from the sheet of metal and to form guide followers for engaging with the guides (e.g. the "U"-shaped guide channels 120 illustrated in FIG. 7) provided at upper and lower portions at either side of the bay 138 for receiving the carriage. The flanges 133 at the front of the carriage 48 can also be formed by suitable stamping and folding of the sheet metal used to form the carriage 48. The screws 132 for mounting the carriage in the system unit chassis 11 are preferably also self-retaining so that they cannot be lost.

To avoid a potential loss of components and for the convenience of users, the cover plates 54 and 56 are preferably supplied screwed to the system unit chassis 11. The carriage can be supplied empty in place behind the cover plates 54 and 56 in the media drive bay. The carriage can be supplied with electromagnetic conduction blanks for blanking plates 180 (see FIG. 8B) at the front of each drive compartment. The blanking plates can be held in the front of the carriage by a resilient member 182. The cover plates 54 and 56 will then hold the blanking plates in place. If and when a media drive is inserted, the appropriate blanking plate can then be removed.

Figure 9:
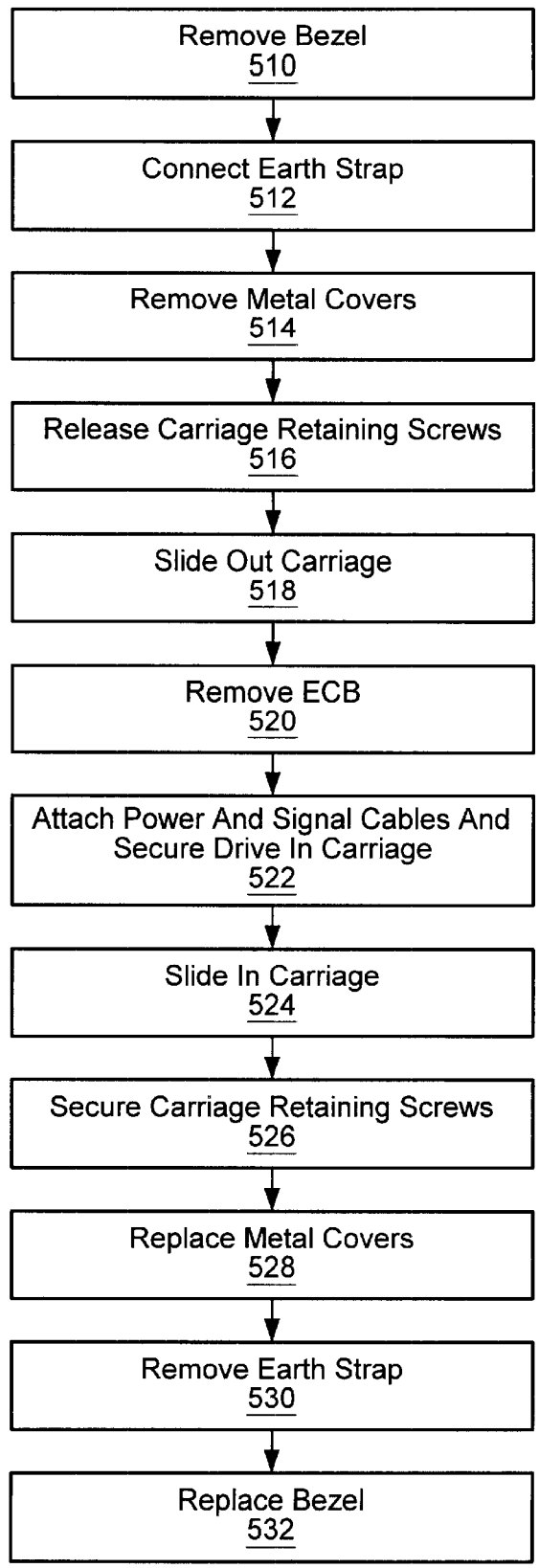
FIG. 9 is a flow diagram setting out the steps in replacing a media drive.

FIG. 9 is a flow diagram illustrating the steps of installing a media drive for the first time.

In step S10, the plastic media cover (bezel 64) is removed by undoing six ¼ turn fasteners.

In step S12, an earthing strap is connected to an earthing stud on the front of the chassis (not shown in FIG. 7).

In step S14, the metal covers 54 and 56 are removed.

In step S16, the screws 132 are undone to release the carriage.

In step S18, the carriage is slid out.

In step S20, the relevant electromagnetic conduction blank is removed.

In step S22, the power and signal cables are attached to the media drive and the media drive is secured in the appropriate place in the carriage using the four retained screws 130 provided. (These operations can be performed in any desired order).

In step S24, the carriage is slid back into the system unit chassis 11.

In step S26, the screws 132 are done up to secure the carriage in the chassis.

In step S28, the cover plates 54 and 56 are reattached using the self-retaining screws provided.

In step S30, the earth strap is disconnected.

In step S32, the plastic decor panel is re-attached using the ¼ turn fasteners.

Figure 10:
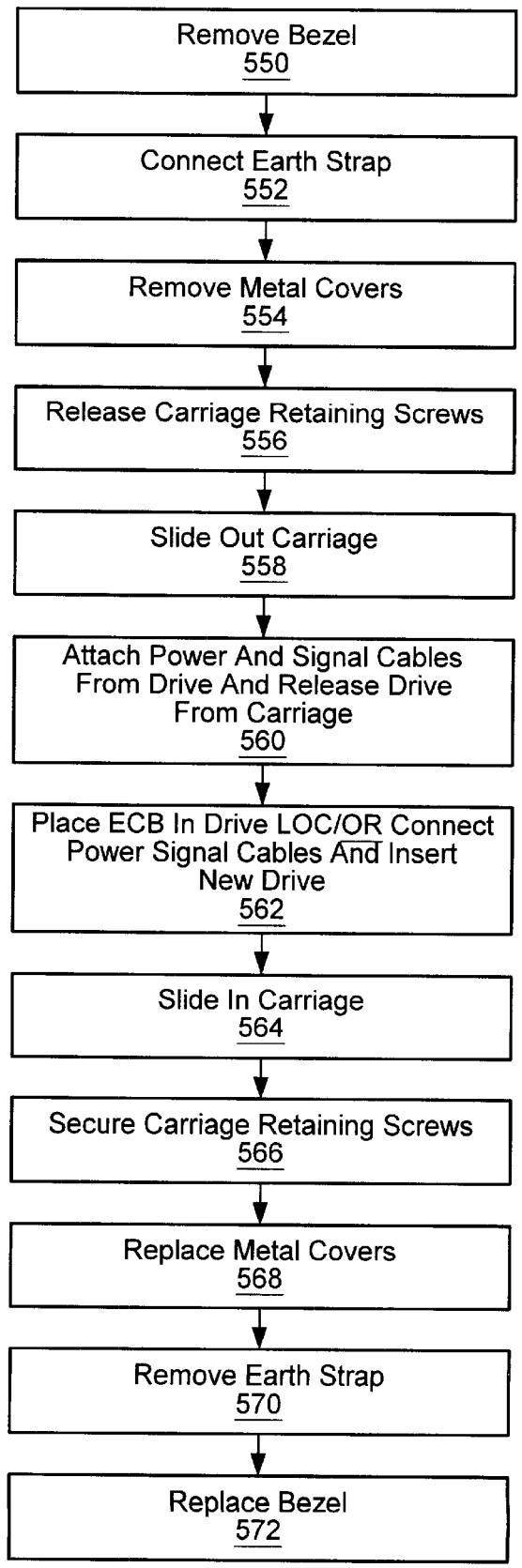
FIG. 10 is a flow diagram illustrating the steps of removing a media drive.

FIG. 10 is a flow diagram illustrating the steps of removing a media drive.

In step S50, the plastic media cover (bezel 64) is removed by undoing six ¼ turn fasteners.

step S52, an earthing strap is connected to an earthing stud on the front of the chassis (not shown in FIG. 7).

In step S54, the metal covers 54 and 56 are removed.

In step S56, the screws 132 are undone to release the carriage.

In step S58, the carriage is slid out.

In step S60, the power and signal cables are removed from the media drive and the media drive is released from the carriage by releasing the four retained screws 130. (These operations can be performed in any desired order).

In step S62, the relevant electromagnetic conduction blank is clipped back in (or alternatively a new media drive can be inserted as at step S22 of FIG. 9).

In step S64, the carriage is slid back into the system unit chassis 11.

In step S66, the screws 132 are done up to secure the carriage in the chassis.

In step S68, the cover plates 54 and 56 are reattached using the self-retaining screws provided.

In step S70, the earth strap is disconnected.

In step S72, the plastic decor panel is re-attached using the ¼ turn fastenings. It will be appreciated that the provision of the slideable carriage greatly facilitates the addition, replacement or removal of a media drive in that access to the media drives for replacement can readily be obtained at the front of the system unit 10 without needing to remove the system unit 10 from the racking in which it is held.

It will be appreciated from the above, that an embodiment of the invention facilitates the installation, removal or replacement of a media drive by avoiding the need to open the main cover of the system unit and, in the case of a rack-mounted system, by avoiding the need to remove the system unit from the rack. Moreover, the provision of self-retaining screws, means that the carriage is provided as an integral unit, without needing loose fastenings which might get lost or, even worse, fall within the system unit and cause a potential hazard.

It will be appreciated that although particular embodiments of the invention have been described, many modifications/additions and/or substitutions may be made within the spirit and scope of the present invention. Accordingly, the particular example described is intended to be illustrative only, and not limitative.

What is claimed is:

1. A system unit comprising:
    a chassis having an aperture in a surface thereof;
    a motherboard attached to the chassis;
    a guide attached to the chassis adjacent to the aperture;
    a carriage coupled to the guide, wherein the guide allows the carriage to be positioned inside the chassis, and wherein the carriage comprises:
        space for receiving at least one media drive; and
        at least one guide follower configured to engage the guide and allow the carriage to be inserted into or removed from the chassis; and
    cabling to electrically couple a media drive positioned in the carriage to the motherboard, wherein the cabling has sufficient length to allow attachment of the media drive to the motherboard when the carriage is positioned such that the media drive does not extend beyond the surface and into the chassis;

wherein the carriage further comprises screws for engaging threaded holes in the media drive, and wherein the screws are inhibited from being removed from the carriage when the screws are not in use to couple the media drive to the carriage.

2. The system unit of claim 1, wherein the surface of the system unit is a front surface thereof.

3. The system unit of claim 1, wherein the surface of the system unit is a rear surface thereof.

4. The system unit of claim 1, wherein the system is configured to be mountable in a rack.

5. The system unit of claim 1, wherein the system unit is a computer system unit comprising at least one processor and memory.

6. The system unit of claim 1, wherein the system unit is configured to be moved in a rack.

7. The system unit of claim 1, wherein the carriage comprises first and second side walls spaced apart by a separating portion, the first and second side walls and the separating portion defining at least one location for receiving the at least one media drive.

8. The system unit of claim 7, wherein the separating portion forms a wall extending substantially perpendicularly to the side walls.

9. The system unit of claim 7, wherein the carriage comprises mounts positioned inward from the side walls, the mounts spaced apart a distance to receive the media drive.

10. The system unit of claim 1, wherein the carriage is formed by stamping a sheet of metal.

11. The system unit of claim 1, wherein the carriage is configured to receive two media drives.

12. The system unit of claim 1, wherein the at least one guide follower comprises a flange for cooperating with the corresponding guide in the system unit.

13. The system unit of claim 12, wherein the carriage comprises at least two guide followers, each guide follower comprising a flange.

14. The system unit of claim 1, wherein the carriage comprises at least one mount for retaining the media drive in the carriage.

15. The system unit of claim 1, wherein the carriage comprises at least one fastener for securing the carriage to the chassis.

16. The system unit of claim 15, wherein the at least one fastener comprises a screw that engages an opening in the chassis and is inhibited from being removed from the carriage when the screw is not in use to secure the carriage to the chassis.

17. The system unit of claim 15, wherein the at least one fastener is inhibited from being removed from the carriage when the fastener is not in use to secure the carriage to the chassis.

18. The system unit of claim 1, further comprising at least one disposable electromagnetic conduction blank for covering an entry into the space when the media drive is not coupled to the carriage.

19. A method of forming a server within a chassis, comprising:
  attaching a motherboard to the chassis, wherein the motherboard includes at least one central processing unit and memory, and wherein the chassis includes an aperture in a wall;
  mounting at least one media drive to a carriage, wherein the carriage is mounted to the chassis so that carriage slides into the chassis through the aperture;
  electrically connecting the motherboard to the at least one media drive with at least one cable when the media drive is outside of the chassis;
  sliding the carriage and at least one media drive into the chassis;
  securing the carriage to the chassis;
  unsecuring the carriage from the chassis;
  sliding the carriage out through the aperture;
  disconnecting the at least one cable from the at least one media drive; and
  removing the media drive from the carriage; and
  placing at least one electromagnetic conduction blank in the carriage after removing the media drive.

20. The method of claim 19, wherein the at least one cable is connected to the at least one media drive before it is mounted in the carriage.

21. The method of claim 19, wherein the at least one media drive is mounted in the carriage before the at least one cable is connected to the at least one media drive.

22. The method of claim 19, wherein disconnecting the at least one cable is performed before removing the media drive from the carriage.

23. The method of claim 19, wherein the media drive is removed from the carriage before disconnecting the at least one cable.

24. A system unit comprising:
  a chassis having an aperture in a surface thereof;
  a motherboard attached to the chassis;
  a guide attached to the chassis adjacent to the aperture;
  a carriage coupled to the guide, wherein the guide allows the carriage to be positioned inside the chassis, and wherein the carriage comprises:
    space for receiving at least one media drive; and
    at least one guide follower configured to engage the guide and allow the carriage to be inserted into or removed from the chassis; and
  cabling to electrically couple a media drive positioned in the carriage to the motherboard, wherein the cabling has sufficient length to allow attachment of the media drive to the motherboard when the carriage is positioned such that the media drive does not extend beyond the surface and into the chassis;
  wherein the carriage further comprises at least one fastener for securing the carriage to the chassis, and wherein the at least one fastener is inhibited from being removed from the carriage when the fastener is not in use to secure the carriage to the chassis.

25. The system unit of claim 24, wherein the surface of the system unit is a front surface thereof.

26. The system unit of claim 24, wherein the surface of the system unit is a rear surface thereof.

27. The system unit of claim 24, wherein the system is configured to be mountable in a rack.

28. The system unit of claim 24, wherein the system unit is a computer system unit comprising at least one processor and memory.

29. The system unit of claim 24, wherein the system unit is configured to be mounted in a rack.

30. The system unit of claim 24, wherein the carriage comprises first and second side walls spaced apart by a separating portion, the first and second side walls and the separating portion defining at least one location for receiving the at least one media drive.

31. The system unit of claim 30, wherein the separating portion forms a wall extending substantially perpendicularly to the side walls.

32. The system unit of claim 30, wherein the carriage comprises mounts positioned inward from the side walls, the mounts spaced apart a distance to receive the media drive.

33. The system unit of claim 24, wherein the carriage is formed by stamping a sheet of metal.

34. The system unit of claim 24, wherein the carriage is configured to receive two media drives.

35. The system unit of claim 24, wherein the at least one guide follower comprises a flange for cooperating with the corresponding guide in the system unit.

36. The system unit of claim 35, wherein the carriage comprises at least two guide followers, each guide follower comprising a flange.

37. The system unit of claim 24, wherein the carriage comprises at least one mount for retaining the media drive in the carriage.

38. The system unit of claim 24, wherein the carriage comprises screws for engaging threaded holes in the media drive.

39. The system unit of claim 38, wherein the screws are inhibited from being removed from the carriage when the screws are not in use to couple a media drive to the carriage.

40. The system unit of claim 24, wherein the at least one fastener comprises a screw that engages an opening in the chassis.

41. The system unit of claim 24, further comprising at least one disposable electromagnetic conduction blank for covering an entry into the space when a media drive is not coupled to the carriage.

42. A system unit comprising:
a chassis having an aperture in a surface thereof;
a motherboard attached to the chassis;
a guide attached to the chassis adjacent to the aperture;
a carriage coupled to the guide, wherein the guide allows the carriage to be positioned inside the chassis, and wherein the carriage comprises:
space for receiving at least one media drive; and
at least one guide follower configured to engage the guide and allow the carriage to be inserted into or removed from the chassis;
cabling to electrically couple a media drive positioned in the carriage to the motherboard, wherein the cabling has sufficient length to allow attachment of the media drive to the motherboard when the carriage is positioned such that the media drive does not extend beyond the surface and into the chassis; and
at least one disposable electromagnetic conduction blank for covering an entry into the space when a media drive is not coupled to the carriage.

43. The system unit of claim 42, wherein the surface of the system unit is a front surface thereof.

44. The system unit of claim 42, wherein the surface of the system unit is a rear surface thereof.

45. The system unit of claim 42, wherein the system is configured to be mountable in a rack.

46. The system unit of claim 42, wherein the system unit is a computer system unit comprising at least one processor and memory.

47. The system unit of claim 42, wherein the system unit is configured to be mounted in a rack.

48. The system unit of claim 42, wherein the carriage comprises first and second side walls spaced apart by a separating portion, the first and second side walls and the separating portion defining at least one location for receiving the at least one media drive.

49. The system unit of claim 48, wherein the separating portion forms a wall extending substantially perpendicularly to the side walls.

50. The system unit of claim 48, wherein the carriage comprises mounts positioned inward from the side walls, the mounts spaced apart a distance to receive the media drive.

51. The system unit of claim 42, wherein the carriage is formed by stamping a sheet of metal.

52. The system unit of claim 42, wherein the carriage is configured to receive two media drives.

53. The system unit of claim 42, wherein the at least one guide follower comprises a flange for cooperating with the corresponding guide in the system unit.

54. The system unit of claim 53, wherein the carriage comprises at least two guide followers, each guide follower comprising a flange.

55. The system unit of claim 42, wherein the carriage comprises at least one mount for retaining the media drive in the carriage.

56. The system unit of claim 42, wherein the carriage comprises screws for engaging threaded holes in the media drive.

57. The system unit of claim 42, wherein the screws are inhibited from being removed from the carriage when the screws are not in use to couple a media drive to the carriage.

58. The system unit of claim 42, wherein the carriage comprises at least one fastener for securing the carriage to the chassis.

59. The system unit of claim 58, wherein the at least one fastener comprises a screw that engages an opening in the chassis and is inhibited from being removed from the carriage when the screw is not in use to secure the carriage to the chassis.

60. The system unit of claim 58, wherein the at least one fastener is inhibited from being removed from the carriage when the fastener is not in use to secure the carriage to the chassis.

* * * * *